June 4, 1957  W. H. SHORTELL  2,794,469
HOLE SAWS
Filed Jan. 11, 1954
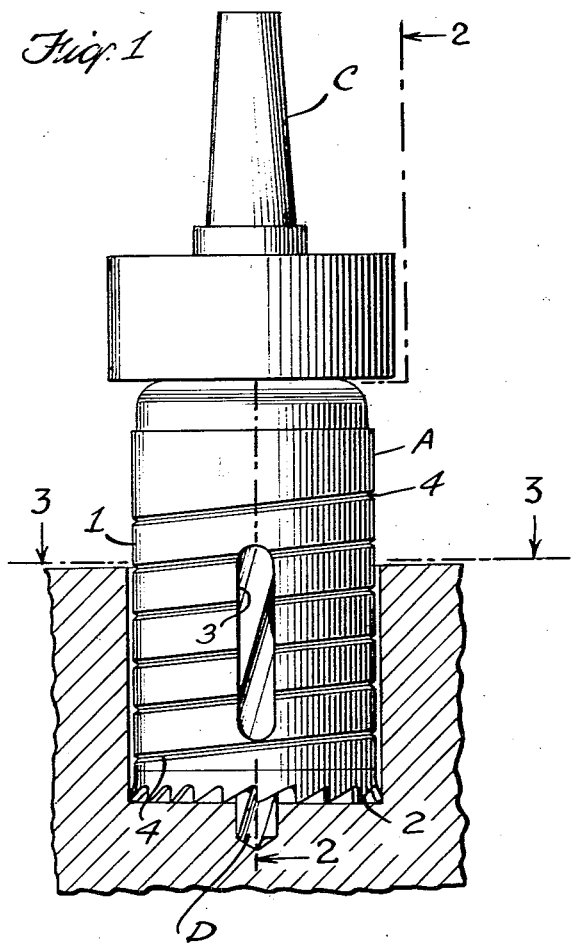
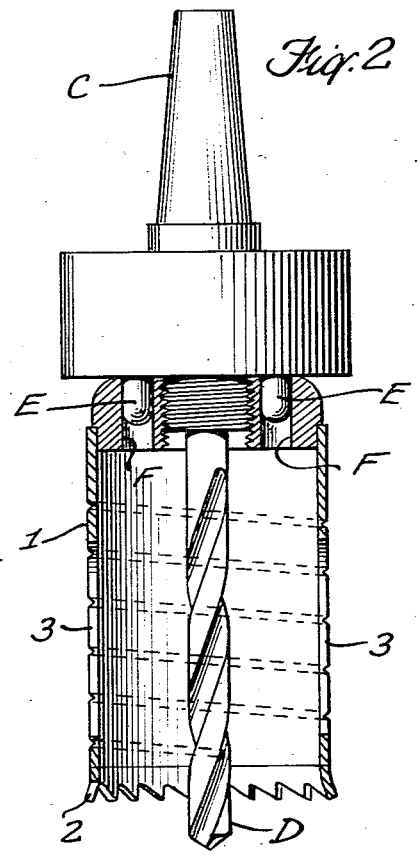
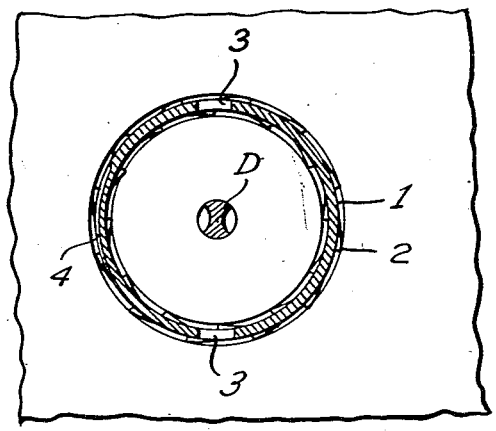
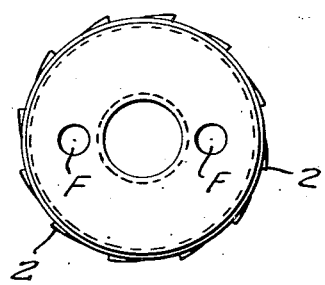
INVENTOR
WILLIAM H. SHORTELL
BY
ATTORNEY United States Patent Office 2,794,469
Patented June 4, 1957

2,794,469

HOLE SAWS

William H. Shortell, Greenfield, Mass., assignor to Millers Falls Company, Greenfield, Mass., a corporation of Massachusetts Application January 11, 1954, Serial No. 403,392

1 Claim. (Cl. 145—120)

This invention relates to hole saw blades, and its object is to provide a more efficient blade in which the dust, caused by the operation of the saw, is carried up and away from the cutting edge, and clogging and inefficient saw action resulting therefrom is accordingly prevented.

The invention accordingly comprises the features of construction, combination of elements and arrangements of parts which will be exemplified in the construction hereinafter set forth, and the scope of the application of which will be indicated in the claim.

For a full understanding of the nature and objects of the invention reference should be had to the following detailed description taken in connection with the accompanying drawings, in which:

Figure 1 is a view showing the blade in side elevation, mounted for action, with driving means and a centering drill, and indicating also a work block in which a hole has been cut;

Figure 2 is a view, partly in side elevation, showing the blade in section;

Figure 3 is a cross section taken on the line 3/3 of Figure 1 looking in the direction of the arrows;

Figure 4 is an end view in elevation looking from the upper end of the blade, as shown in Figure 1, with the driving means removed.

The blade A is shown as equipped with a suitable driving means having an angular stud C for engagement with the chuck of a driving motor and a centering drill D. The driving means and the drill are of well-known construction and pins E are shown carried by the part B and passing into holes F in the upper end of the blade to form the driving connection therebetween.

We pass now to the construction of the blade A which forms the novel feature of this invention.

This blade, as shown, is cylindrical in form and has two parts, the main part 1 being formed of low carbon alloy steel with a cutting edge 2 welded, or otherwise carried thereby, and equipped with cutting teeth, as shown. In the part 1 of the blade are shown two slots 3.

On the surface of the part 1 of the blade, here shown as on the outer surface, is a spiral groove 4 beginning at the lower end of the part 1 adjacent to, but not in, the cutting edge 2, and running spirally around the blade for a number of turns until it reaches a point toward the upper end of the blade, as shown.

In operation, the dust particles caused by the operation of the saw, which, if not removed, would tend to collect and interfere with the satisfactory operation of the saw, are carried upward along the groove 4 and finally discharged toward the upper end of the blade. The dust accumulating on the inside of the blade is thrown out by centrifugal action through the slots 3 where it may reach the groove 4 and be carried upward.

The making of the main portion of this blade of low carbon alloy steel makes the impression of the groove 4 therein more easy, and the making of the cutting edge of high speed renders the saw more efficient in cutting various kinds of material.

Having described my invention, what I claim as new and desire to secure by Letters Patent is:

A hole saw of composite construction including an upper cylindrical body portion of low carbon steel, a narrow lower cylindrical portion of high carbon steel in which cutting teeth alternately having an outward set and an inward set respectively from the outer cylindrical surface and the inner cylindrical surface of said portions are formed, a centering drill extending coaxially through said cylindrical portions and beyond said teeth, and a power chuck stud drivingly connected with said upper cylindrical portion and the upper end of said drill, said upper and lower cylindrical portions having matching inner and outer diameters and being butt welded together on matching flat surfaces, said low carbon upper portion only having a narrow convoluted groove cut into its outer surface and thus inside the radial reach of said outwardly set teeth, and said groove beginning at its lowermost end adjacent to said teeth on said narrow lower portion and terminating adjacent to the upper end of said upper cylindrical portion, said upper portion also having at least one longitudinally extending slot which interrupts said convoluted groove a plurality of times between said narrow lower portion and the upper end of said upper portion to provide a direct passageway for chips from the inner surface of the cylindrical portions to the groove.

References Cited in the file of this patent

UNITED STATES PATENTS

| 467,383 | Roberts | Jan. 19, 1892 |
| 1,073,005 | Watkins | Sept. 9, 1913 |
| 2,015,339 | Ellingham | Sept. 24, 1935 |
| 2,062,257 | Douglas et al. | Nov. 24, 1936 |
| 2,306,807 | Hulvey et al. | Dec. 29, 1942 |
| 2,349,400 | Beckwith | May 23, 1944 |
| 2,473,077 | Starbuck | June 14, 1949 |

FOREIGN PATENTS

| 6,541 | Germany | Jan. 21, 1879 |